3,252,970
AROMATIZATION
Charles Ferdinand Huebner, Chatham, N.J., assignor to Ciba Corporation, New York, N.Y., a corporation of Delaware
No Drawing. Filed Feb. 27, 1963, Ser. No. 261,507
8 Claims. (Cl. 260—239)

The preparation of a variety of aromatic compounds with different functional groups as substituents from aromatic starting materials is limited by the facts that a substituent already present decisively influences the position of substitution of an entering group, and that the conversion of a substituent into another is limited, which inter alia is also due to the usually lower reactivity of an aromatic substituent as compared with the corresponding aliphatic group, and may involve a number of transformations. It has, therefore, been recognized that substituted aliphatic compounds represent a versatile source for the preparation of substituted aromatic compounds, and aromatizations of aliphatic compounds containing functional groups are convenient procedures for the preparation of correspondingly substituted aromatic compounds.

The present invention relates to a new procedure for the preparation of monocyclic carbocyclic aryl compounds, particularly of benzene compounds having as substituents a non-acidic electrophilic group, an N-substituted amino group in the ortho-position to the non-acidic electrophilic group, and in the para-position a substituent $R_a$ representing an aliphatic radical, a carbocyclic aryl radical or a heterocyclic aryl radical, or salts thereof. More especially, the new process of this invention yields compounds of the following formula

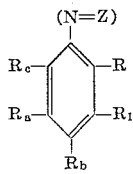

in which the group R is a non-acidic electrophilic group, the group of the formula —(N=Z) is an N-substituted amino group, the group $R_a$ is an aliphatic radical, a carbocyclic aryl radical or a heterocyclic aryl radical, the group $R_1$ is hydrogen, a functionally converted carboxyl group, an aliphatic radical, a carbocyclic aryl radical or a heterocyclic aryl radical, and each of the substituents $R_b$ and $R_c$ is primarily hydrogen, as well as an aliphatic radical, a carbocyclic aryl radical or a heterocyclic aryl radical, and salts thereof.

A non-acidic electrophilic group substituting the benzene portion of a compound prepared according to the process of this invention is primarily a functionally converted carboxyl group, such as esterified carboxyl, particularly carbalkoxy, such as carbo-lower alkoxy, e.g. carbomethoxy, carbethoxy, carbo-n-propoxy, carbo-isopropoxy, carbo-n-butyloxy and the like, or any other esterified carboxyl group, as well as cyano or carbamyl, such as N-unsubstituted carbamyl, N-monosubstituted carbamyl, for example, N-lower alkyl-carbamyl, e.g. N-methyl-carbamyl, N-ethyl-carbamyl and the like, or N,N-disubstituted carbamyl, such as N,N-di-lower alkyl-carbamyl, e.g. N,N-dimethyl-carbamyl, N,N-diethyl-carbamyl and the like. Other electrophilic groups are, for example, nitro, nitro-substituted phenyl, e.g. 4-nitro-phenyl and the like, S-substituted sulfonyl, such as S-lower alkyl-sulfonyl, e.g. S-methyl-sulfonyl and the like, or S-phenyl-sulfonyl and the like.

An N-substituted amino group represented by the group of the formula —(N=Z) may be an N-monosubstituted amino group, such as N-lower alkyl-amino, e.g. N-methyl-amino, N-ethyl-amino and the like, N-cycloalkyl-amino, in which cycloalkyl has from three to eight, preferably from five to seven, carbon atoms, e.g. N-cyclopentyl-amino, N-cyclohexyl-amine, or N-phenyl-lower alkyl-amino, e.g. N-benzyl-amino and the like. However, the N-substituted amino group of the formula —(N=Z) is primarily an N,N-disubstituted amino group in which each of the two substituents may stand for an individual substituent, or may be taken together and form a divalent substituent. A disubstituted amino group is represented, for example, by N,N-di-lower alkyl-amino, e.g. N,N-dimethylamino, N-ethyl-N-methylamino, N,N-diethylamino, N,N-di-n-propylamino, N,N-diisopropylamino and the like, N-cycloalkyl-N-lower alkyl-amino, in which cycloalkyl has from three to eight, preferably from five to seven, carbon atoms, e.g. N-cyclopentyl-N-methyl-amino, N-cyclohexyl-N-methyl-amino and the like, N-phenyl-N-lower alkyl-amino, e.g. N-methyl-N-phenyl-amino and the like, N-phenyl-lower alkyl-N-lower alkyl-amino, e.g. N-benzyl-N-methyl-amino, N-methyl-N-(2-phenylethyl)-amino and the like, or any other suitable N,N-disubstituted amino groups. A divalent substituent, when taken together with the nitrogen atom forms an azacyclic substituent; such substituents are, for example, N,N-alkylene-imino radicals, in which alkylene has from four to seven carbon atoms as ring members, such as 1-pyrrolidino radicals, e.g. 1-pyrrolidino, 2-methyl-1-pyrrolidino and the like, 1-piperidino radicals, e.g. 1-piperidino, 2-methyl-1-piperidino, 3-methyl-1-piperidino, 4-methyl-1-piperidino, 3-hydroxy-1-piperidino, 3-acetoxy-1-piperidino, 3-hydroxymethyl-1-piperidino and the like, 1-N,N-1,6-hexylene-imino radicals, e.g. 1-N,N-(1,6-hexylene)-imino and the like, or 1-N,N-(1,7-heptylene)-imino radicals, e.g. 1-N,N-(1,7-heptylene)-imino and the like, N,N-aza-alkylene-imino radical, in which alkylene has from four to six carbon atoms, and the two nitrogen atoms are separated by two to three carbon atoms, such as 1-piperazino radicals, e.g. 1-piperazino, 4-methyl-1-piperazino, 4-ethyl-1-piperazino, 4-(2-hydroxyethyl)-1-piperazino, 4-(2-acetoxyethyl)-1-piperazino, 4-(2-polyethylenedioxy-ethyl)-1-piperazino and the like, 1-N,N-(3-aza-1,6-hexylene)-imino radicals, e.g. 1-N,N-(3-aza-3-methyl-1,6-hexylene)-imino and the like, or 1-N,N-(4-aza-1,7-heptylene)-imino radicals, e.g. 1-N,N-(4-aza-4-methyl-1,7-heptylene)-imino and the like, N,N-oxa-alkylene-imino radicals, in which alkylene has preferably four carbon atoms, and the oxygen atom is separated from the nitrogen atom by two carbon atoms, such as 4-morpholino radicals, e.g. 4-morpholino and the like, or N,N-thia-alkylene-imino-radical, in which alkylene has preferably four carbon atoms, and the sulfur atom is separated from the nitrogen atom by two carbon atoms, such as 4-thiamorpholino radicals, e.g. 4-thiamorpholino and the like.

A functionally converted carboxyl group representing $R_1$ has the same meaning as above and is primarily esterified carboxyl, such as carbalkoxy, for example, carbo-lower alkoxy, e.g. carbo-methoxy, carbethoxy and the like, as well as cyano or a carbamyl group.

An aliphatic radical as represented by the groups $R_1$, $R_a$, $R_b$ and $R_c$ is primarily a lower aliphatic radical, especially lower alkyl, e.g. methyl, ethyl, n-propyl, isopropyl, n-butyl, isobutyl and the like, as well as lower alkenyl, e.g. allyl and the like. An aliphatic radical may also be a substituted aliphatic radical, such as a carbocyclic aryl-lower aliphatic radical, especially phenyl-lower alkyl, e.g. benzyl, 2-phenylethyl and the like, or substituted phenyl-lower alkyl, in which phenyl has one or more than one of the same or of different substituents attached to any position available for substitution, such as lower alkyl, e.g. methyl, ethyl, n-propyl, isopropyl and the like, lower alkoxy, e.g. methoxy, ethoxy, n-propyloxy and the like, halogeno, e.g. fluoro, chloro, bromo and the like, or any other suitable substituent, as well as a cycloaliphatic radical, such as cycloalkyl having from three to eight, preferably from five to seven ring carbon atoms, e.g. cyclopropyl, cyclopentyl, cyclohexyl, cycloheptyl and the like, a cycloaliphatic-lower aliphatic radical, such as cycloalkyl-lower alkyl, in which cycloalkyl has from three to eight, preferably from five to seven, ring carbon atoms, e.g. cyclopropylmethyl, cyclopentylmethyl, 2-cyclopentylethyl, cyclohexylmethyl, 1-cyclohexylethyl and the like, or any other suitable aliphatic radical.

A carbocyclic aryl group representing $R_1$, $R_a$, $R_b$ or $R_c$ is primarily monocyclic carbocyclic aryl, i.e. phenyl or substituted phenyl, as well as bicyclic carbocyclic aryl, i.e. naphthyl or substituted naphthyl. The substituted phenyl and substituted naphthyl radicals contain one or more than one of the same or of different substituents attached to any position available for substitution; substituents are, for example, lower alkyl, e.g. methyl, ethyl, n-propyl, isopropyl and the like, lower alkoxy, e.g. methoxy, ethoxy, n-propyloxy and the like, halogeno, e.g. fluoro, chloro, bromo and the like, or any other suitable substituent.

A heterocyclic aryl group representing $R_1$, $R_a$, $R_b$ or $R_c$ is preferably a monocyclic heterocyclic radical, such as a monocyclic azacyclic radical, such as pyridyl, e.g. 2-pyridyl, 3-pyridyl or 4-pyridyl, as well as pyridazinyl, e.g. 3-pyridazinyl or 4-pyridazinyl, pyrimidyl, e.g. 2-pyrimidyl, 4-pyrimidyl or 5-pyrimidyl, pyrazinyl, e.g. 2-pyrazinyl, as well as monocyclic oxacyclic aryl, such as furyl, e.g. 2-furyl and the like, or monocyclic thiacyclic aryl, such as thienyl, e.g. 2-thienyl and the like. Other heterocyclic aryl radicals are bicyclic heterocyclic aryl radicals, such as bicyclic azacyli aryl, for example, quinolinyl, e.g. 2-quinolinyl, 4-quinolinyl and the like, isoquinolinyl, e.g. 1-isoquinolinyl and the like, or other analogous bicyclic heterocyclic aryl radicals.

The compounds prepared according to the procedure of the present invention have valuable properties and can be used per se or as intermediates for the preparation of other compounds. For example, they absorb ultraviolet light of wave-lengths between 300 m$\mu$ and 350 m$\mu$, and can, therefore, be used as the active sun screen agent in topical preparations for the prevention of sunburns. They may be made up into such compositions according to customary methods; preferably they are incorporated into a hydrophilic ointment which contains inter alia glycols, e.g. propylene glycol and the like, higher aliphatic alcohols, e.g. stearyl alcohol and the like, white petrolatum, water or any other inert ingredients used in sun screen preparation. The latter have from about three to about five percent of the ultraviolet light absorbent. Furthermore, the compounds prepared according to the process of the invention can be used as plasticizers for synthetic resin compositions, and represent versatile intermediates for the preparation of other compounds useful as pharmaceuticals, polymerization monomers, dyestuffs (for example, in a resulting compound having a nitro group as a substituent, such group may be converted into amino, which may be diazotized and then coupled with a coupling compound to form an azo-dyestuff compound) or any other useful chemical compound containing a carbocyclic aryl nucleus.

The novel procedure for the preparation of the above compounds comprises reacting a 2-(N-substituted amino)-1-prop-1-enyl $R_a$-ketone compound, in which $R_a$ has the previously-given meaning, and the $\gamma$-carbon atom of the 1-prop-1-enyl portion has at most one substituent, particularly an enamine ketone compound of the formula

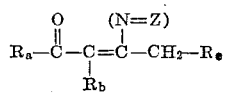

in which $R_a$, $R_b$ and $R_c$ and the group of the formula —(N=Z) have the previously-given meaning, with an acetylene compound having a non-acidic electrophilic group substituting one of the acetylene carbon atoms, such as an acetylene compound of the formula $$R-C \equiv C-R_1$$

in which R and $R_1$ have the previously-given meaning, and, if desired, converting a resulting salt into the free compound or into another salt, and/or, if desired, converting a resulting compound into a salt thereof, and/or, if desired, converting in a resulting compound a functional group into another functional group.

Preferably the process of this invention is carried out by mixing the two reagents, advantageously in the presence of a diluent, such as, for example, tetrahydrofuran, p-dioxane, dimethoxyethane, diethyleneglycol dimethylether, diethyl ether, N,N-dimethylformamide, dimethylsulfoxide and the like; these diluents are preferably dried before use. Usually, the reaction occurs spontaneously upon mixing the two reagents at room temperature; the temperature of the reaction mixture rises and may then be maintained at from about 50° C. to about 120° C. by external heating to complete the reaction. If necessary, the latter may have to be initiated by heating, and may have to be carried out in the atmosphere of an inert gas, e.g. nitrogen.

In the above reaction, an enamine, in which the N-substituted amino group is N-monosubstituted amino, is reacted with an acetylene compound in which both acetylene carbon atoms are substituted.

The preferred enamine compounds used as the starting material have the formula

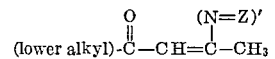

in which the group of the formula —(N=Z)' stands for N,N-di-lower alkyl, 1-N,N-alkylene-imino, in which alkylene has from four to seven carbon atoms, and 4-morpholino, and lower alkyl has preferably from one to seven, for example, from one to four, carbon atoms.

Preferred acetylene compounds having an non-acidic electrophilic group substituting one of the acetylene carbon atoms, are functional derivatives of propiolic acid, or, preferably, of acetylene dicarboxylic acid, especially the lower alkyl propiolates and di-lower alkyl acetylene dicarboxylates in which lower alkyl has preferably from one to seven, for example, from one to four, carbon atoms, as well as propiolonitrile or 1,2-dicyano-acetylene. Other acetylene compounds are, for example, 1-nitro-2-phenyl-acetylene, (4-nitrol-phenyl)-acetylene, 1-phenyl-sulfonyl-1-propynyl and the like.

The starting materials used in the process of the invention are known or may be prepared according to known methods. Thus, a 2-oxo-1-propyl $R_a$-ketone compound, particularly a compound of the formula

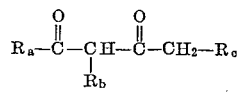

in which $R_a$, $R_b$ and $R_c$ have the previously-given meaning, when treated with an N-substituted amine, especially an amine of the formula H—(N=Z), in which the group —(N=Z) has the previously-given meaning, preferably in the presence of an inert solvent, e.g. ethyl acetate, benzene, toluene and the like, and, if necessary, while removing water, for example, by azeotropic distillation, yields the desired enamine starting material.

A resulting acid addition salt may be converted into the free compound, for example, by treating it with a base, such as a metal hydroxide, e.g. sodium hydroxide, potassium hydroxide, calcium hydroxide and the like, a metal carbonate, e.g. sodium, potassium or calcium carbonate or hydrogen carbonate and the like, ammonia and the like, or with an hydroxyl ion exchange preparation or any other suitable reagent.

A resulting acid addition salt may also be converted into another acid addition salt; for example, a salt with an inorganic acid may be reacted with a metal, e.g. sodium, barium, silver and the like, salt of an acid in the presence of a diluent, in which a resulting inorganic compound is insoluble and is thus removed from the reaction, or an acid addition salt may be reacted with an anion exchange preparation.

A free compound may be converted into an acid addition salt thereof, for example, by reacting it with an acid, preferably in the presence of a suitable solvent or solvent mixture, or with an anion exchange preparation, and isolating the desired salt.

In a resulting compound, a functional group may be converted into another functional group. For example, an esterified carboxyl group may be converted into a free carboxyl group, for example, by hydrolysis using an aqueous or alcoholic alkaline reagent, such as an alkali metal hydroxide or an alkaline earth metal hydroxide, e.g. sodium hydroxide, potassium hydroxide and the like.

An esterified carboxyl group in a resulting compound may also be converted into another esterified carboxyl group by transesterification using an alcohol in the presence of a suitable transesterification reagent, such as an alkali metal alcoholate, an alkaline earth metal alcoholate, an aluminum alcoholate, potassium cyanide, benzyl trimethyl ammonium hydroxide, tungstic acid, p-toluene sulfonic acid and the like. Conversion of an esterified carboxyl group into another esterified carboxyl group may also be carried out in steps; it may first be converted into the free carboxyl group (by hydrolysis as previously-described), and the latter may be re-esterified according to known methods, for example, by treatment with an alcohol in the presence of a suitable acid, a diazo-compound and the like.

A nitro substituent in a resulting compound may be converted into an amino group by reduction, for example, with nascent or catalytically activated hydrogen and the like.

Also included within the scope of the present invention are the new compounds of the formula

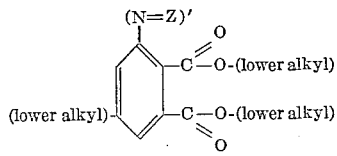

in which the group of the formula —(N=Z)' has the previously-given meaning, and lower alkyl has from one to seven, preferably from one to four, carbon atoms, or the salts thereof; these compounds are prepared very conveniently according to the process of this invention and, in view of their ultraviolet light absorption, are useful as sun-screen agents, but may also serve as plasticizers, intermediates for the preparation of other compounds, such as pharmaceuticals, dyestuffs and the like.

Salts of the above compounds are addition salts with inorganic acids, e.g. hydrochloric, hydrobromic, nitric, sulfuric, phosphoric acids and the like, or organic acids, such as organic carboxylic acids, e.g. acetic, propionic, glycolic, oxalic, malonic, succinic, maleic, hydroxymaleic, fumaric, malic, tartaric, citric, benzoic, salicylic, 4-aminosalicylic, 2-phenoxybenzoic, nicotinic, isonicotinic acid, or an organic sulfonic acid, e.g. methane sulfonic, ethane sulfonic, 2-hydroxyethane sulfonic, benzene sulfonic, toluene sulfonic, 2-naphthalene sulfonic acid. Salts which may be formed for identification purposes are, for example, those with acidic organic nitro compounds, e.g. picric, picrolonic, flavianic acid and the like, or with metal complex acids, e.g. phosphotungstic, phosphomolybdic, chloroplatinic, Reinecke acid and the like.

The following example is intended to illustrate the invention and is not to be construed as being a limitation thereon. Temperatures are given in degrees centigrade.

*Example*

To a warm solution of 5.0 g. of 4-oxo-2-(1-pyrrolidino)-2-pentene in 10 ml. of tetrahydrofuran is added dropwise 4.7 g. of dimethyl acetylene dicarboxylate. The temperature rises spontaneously to 90°, at which it is held for an additional thirty minutes by heating on the steam bath. The red solution is poured into water, the resulting precipitate is filtered off and recrystallized from methanol to yield the dimethyl 5-methyl-3-(1-pyrrolidino)-phthalate of the formula

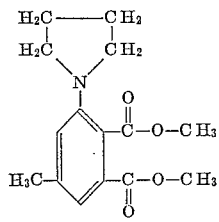

The compound melts at 83–85°; its ultraviolet absorption spectrum (taken in ethanol): $\lambda_{max.}$ at 218–224 m$\mu$ (plateau), 236 m$\mu$, 274 m$\mu$ and 346–348 m$\mu$; yield: 3.3 g.

Upon treatment with sodium hydroxide in aqueous ethanol, and subsequent acidification with aqueous hydrochloric acid, the dimethyl 5-methyl-3-(1-pyrrolidino)-phthalate yields the 5-methyl-3-(1-pyrrolidino)-phthalic acid, which may be isolated in its free form or as the hydrochloride.

By substituting in the above example ethyl propiolate, propiolonitrile or 1,2-dicyano-acetylene for the dimethyl acetylene dicarboxylate, the ethyl 4-methyl-2-(1-pyrrolidino)-benzoate, 4-methyl-2-(1-pyrrolidino)-benzonitrile and 5-methyl-2-(1-pyrrolidino)-phthalonitrile, respectively, is formed.

The starting material used in the above example is known (Leonard et al., J. Am. Chem. Soc., vol. 81, p. 595 (1959)), and is prepared as follows: To a solution of 50.0 g. of pentan-2,4-dione in 100 ml. of ethyl acetate is added in small portions 35.6 g. of pyrrolidine. The reaction mixture is allowed to stand for three hours at room temperature, and is then cooled. The resulting crystalline material is filtered off and recrystallized from ethyl acetate to yield the 4-oxo-2-(1-pyrrolidino)-2-pentene, M.P. 110–114°.

Other compounds formed according to the new process of this invention by selecting the appropriate starting materials are, for example, Dimethyl 3-N-ethylamino-5-methyl phthalate,
Dimethyl 3-N,N-dimethylamino-5-methyl-phthalate,
Diethyl 3-N,N-diethylamino-5-ethyl-phthalate,
Dimethyl 3-N-benzyl-N-methyl-amino-4,5-dimethyl-phthalate,
Dimethyl 5-phenyl-3-(1-piperidino)-phthalate,
Diethyl 5-methyl-3-(4-morpholino)-6-phenyl-phthalate,
Ethyl 4-isopropyl-2-N,N-dimethylamino-benzoate,
n-propyl 4,6-dimethyl-2-(1-piperidino)-benzoate,
3-N,N-dimethylamino-5-methyl-phthalonitrile,
5-methyl-2-nitro-3-(1-pyrrolidino)-biphenyl,
4-methyl-2-(1-pyrrolidino)-4'-nitro-biphenyl,
4-(S-phenyl-sulfonyl)-5-(1-pyrrolidino)1,3-xylene and the like.

What is claimed is:
1. A process for the preparation of a compound of the formula

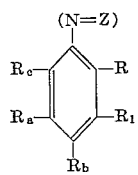

in which the group R is a non-acidic electrophilic group selected from the group consisting of esterified carboxy, cyano, carbamyl, nitro, nitrophenyl, S-lower alkyl sulfonyl and S-phenyl sulfonyl, the group of the formula —(N=Z) is a member selected from the group consisting of N-lower alkyl-amino, N-cycloalkyl-amino in which cycloalkyl has from three to eight ring carbon atoms, N-phenyl-lower alkyl-amino, N,N-di-lower alkyl-amino, N-cycloalkyl-N-lower alkyl-amino in which cycloalkyl has from three to eight ring carbon atoms, N-phenyl-N-lower alkyl-amino, N-phenyl-lower alkyl-N-lower alkyl-amino, N,N-alkyleneimino in which alkylene has from four to seven ring carbon atoms, N,N-aza-alkylene-imino in which alkylene has from four to six ring carbon atoms and the two nitrogen atoms are separated by two to three carbon atoms, 4-morpholino and 4-thiamorpholino, the group $R_a$ is a member selected from the group consisting of lower alkyl, lower alkenyl, phenyl-lower alkyl, phenyl-lower alkyl in which phenyl is substituted by a member selected from the group consisting of lower alkyl, lower alkoxy and halogeno, cycloalkyl having from three to eight ring carbon atoms, cycloalkyl-lower alkyl in which cycloalkyl has from three to eight ring carbon atoms, phenyl naphthyl, phenyl substituted by a member selected from the group consisting of lower alkyl, lower alkoxy and halogeno, naphthyl substituted by a member selected from the group consisting of lower alkyl, lower alkoxy and halogeno, pyridyl, pyridazinyl, pyrimidyl, furyl, thienyl, quinolinyl and isoquinolinyl, the group $R_1$ is a member selected from the group consisting of hydrogen, carbalkoxy, cyano, carbamyl, lower alkyl, lower alkenyl, phenyl-lower alkyl, phenyl-lower alkyl in which phenyl is substituted by a member selected from the group consisting of lower alkyl, lower alkoxy and halogeno, cycloalkyl having from three to eight ring carbon atoms, cycloalkyl-lower alkyl in which cycloalkyl has from three to eight ring carbon atoms, phenyl, naphthyl, phenyl substituted by a member selected from the group consisting of lower alkyl, lower alkoxy and halogeno, naphthyl substituted by a member selected from the group consisting of lower alkyl, lower alkoxy and halogeno, pyridyl, pyridazinyl, pyrimidyl, furyl, thienyl, quinolinyl and isoquinolinyl, and each of the groups $R_b$ and $R_c$ is a member selected from the group consisting of hydrogen, lower alkyl, lower alkenyl, phenyl-lower alkyl, phenyl-lower alkyl in which phenyl is substituted by a member selected from the group consisting of lower alkyl, lower alkoxy and halogeno, cycloalkyl having from three to eight ring carbon atoms, cycloalkyl-lower alkyl in which cycloalkyl has from three to eight ring carbon atoms, phenyl, naphthyl, phenyl substituted by a member selected from the group consisting of lower alkyl, lower alkoxy and halogeno, naphthyl substituted by a member selected from the group consisting of lower alkyl, lower alkoxy and halogeno, pyridyl, pyridazinyl, pyrimidyl, furyl, thienyl, quinolinyl and isoquinolinyl, which comprises reacting an enamine compound of the formula

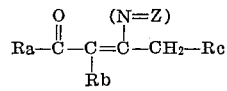

in which $R_a$, $R_b$, $R_c$ and the group of the formula $$-(N=Z)$$

have the previously-given meaning, with an acetylene compound of the formula $$R-C\equiv C-R_1$$

in which R and $R_1$ have the previously-given meaning.

2. A process according to claim 1 which comprises carrying out the reaction in the presence of a diluent.

3. A process according to claim 1, which comprises mixing the two reagents at room temperature.

4. A process according to claim 1, which comprises completing the reaction by heating to from about 50° to about 120°.

5. A process according to claim 1, which comprises using, as an enamine, a compound of the formula

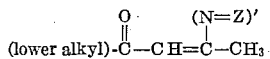

in which the group of the formula —(N=Z)′ stands for a member selected from the group consisting of N,N-di-lower alkyl-amino, 1-N,N-alkylene-imino, in which alkylene has from four to seven carbon atoms, and 4-morpholino.

6. A process according to claim 1, which comprises using as an acetylenic compound a member selected from the group consisting of a carbalkoxy, cyano and carbamyl derivative of a member selected from the group consisting of propiolic acid and acetylene dicarboxylic acid.

7. A process according to claim 1, which comprises using a lower alkyl propiolate as the acetylene compound.

8. A process according to claim 1, which comprises using a di-lower alkyl acetylene dicarboxylate as the acetylene compound.

References Cited by the Examiner

Taylor et al.: "J. Am. Chem. Soc.," vol. 31, pages 483–490 (1909).

NICHOLAS S. RIZZO, *Primary Examiner.*

JOSE TOVAR, *Assistant Examiner.*